(12) United States Patent
Kakishima et al.

(10) Patent No.: US 12,255,707 B2
(45) Date of Patent: Mar. 18, 2025

(54) TERMINAL AND COMMUNICATION METHOD

(71) Applicant: NTT DOCOMO, INC., Tokyo (JP)

(72) Inventors: Yuichi Kakishima, Tokyo (JP); Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 414 days.

(21) Appl. No.: 17/633,866

(22) PCT Filed: Aug. 15, 2019

(86) PCT No.: PCT/JP2019/032064
§ 371 (c)(1),
(2) Date: Feb. 8, 2022

(87) PCT Pub. No.: WO2021/029067
PCT Pub. Date: Feb. 18, 2021

(65) Prior Publication Data
US 2022/0368380 A1 Nov. 17, 2022

(51) Int. Cl.
*H04B 7/0452* (2017.01)
*H04L 5/00* (2006.01)
*H04W 16/28* (2009.01)

(52) U.S. Cl.
CPC ......... *H04B 7/0452* (2013.01); *H04L 5/0048* (2013.01); *H04W 16/28* (2013.01)

(58) Field of Classification Search
CPC .. H04B 1/126; H04B 1/10027; H04B 7/0452; H04B 7/0456; H04J 11/0026; H04J 11/0056; H04L 5/0048; H04W 16/28
See application file for complete search history.

(56) References Cited

U.S. PATENT DOCUMENTS 8,416,876 B2 * 4/2013 Lee .................. H04J 11/004
375/267
8,451,944 B2 * 5/2013 Gaur .................. H04B 7/0426
375/350
(Continued)

FOREIGN PATENT DOCUMENTS

JP 2018-067774 A 4/2018
WO 2019/065189 A1 4/2019

OTHER PUBLICATIONS

International Search Report issued in PCT/JP2019/032064 on Mar. 17, 2020 (5 pages).
(Continued)

*Primary Examiner* — Alpus Hsu
(74) *Attorney, Agent, or Firm* — Osha Bergman Watanabe & Burton LLP

(57) ABSTRACT

A terminal includes a reception unit configured to receive information associated with a signal transmitted to an apparatus other than the terminal, in MU-MIMO (MultiUser-Multiple Input Multiple Output) and a reference signal from a base station, a control unit configured to estimate interference from the signal transmitted to the apparatus other than the terminal to a signal transmitted to the terminal, based on the information associated with the signal transmitted to the apparatus other than the terminal and the reference signal, and a communication unit configured to suppress the interference and receive a data signal from the base station.

5 Claims, 10 Drawing Sheets

(56) References Cited

U.S. PATENT DOCUMENTS

| | | | |
|---|---|---|---|
| 9,124,319 B2* | 9/2015 | Prasad | H04B 7/0452 |
| 9,264,097 B2* | 2/2016 | Gorokhov | H04B 1/7103 |
| 9,667,372 B2* | 5/2017 | Ohwatari | H04J 11/005 |
| 9,769,810 B2* | 9/2017 | Imamura | H04B 7/0452 |
| 9,794,004 B2* | 10/2017 | Yoo | H04W 24/02 |
| 9,854,521 B2* | 12/2017 | Koo | H04W 52/0238 |
| 9,918,249 B2* | 3/2018 | Kim | H04W 28/04 |
| 2013/0208654 A1* | 8/2013 | Fujii | H04W 16/26 370/315 |
| 2015/0043522 A1* | 2/2015 | Mobasher | H04B 7/0456 370/330 |
| 2016/0150548 A1* | 5/2016 | Wu | H04L 5/0073 370/329 |
| 2016/0373204 A1* | 12/2016 | Yamada | H04J 11/0026 |
| 2017/0149493 A1* | 5/2017 | Arapoglou | H04L 25/0224 |
| 2017/0230135 A1* | 8/2017 | Oh | H04L 5/0073 |
| 2018/0006690 A1* | 1/2018 | Shepard | H04B 7/0452 |
| 2018/0115963 A1* | 4/2018 | Luo | H04L 27/2604 |
| 2018/0331746 A1* | 11/2018 | Okuyama | H04B 7/0632 |
| 2019/0222246 A1* | 7/2019 | Takahashi | H04B 1/126 |
| 2019/0363765 A1* | 11/2019 | Yoshioka | H04B 7/0456 |

OTHER PUBLICATIONS

Written Opinion of the International Searching Authority issued in PCT/JP2019/032064 on Mar. 17, 2020 (3 pages).

3GPP TS 38.300 V15.6.0; "3rd Generation Partnership Project; Technical Specification Group Radio Access Network; NR; NR and NG-RAN Overall Description; Stage 2 (Release 15)"; Jun. 2019 (99 pages).

3GPP TS 38.211 V15.6.0; "3rd Generation Partnership Project; Technical Specification Group Radio Access Network; NR; Physical channels and modulation (Release 15)"; Jun. 2019 (97 pages).

* cited by examiner

TERMINAL AND COMMUNICATION METHOD

TECHNICAL FIELD

The present invention relates to a terminal and a communication method in a radio communication system.

BACKGROUND ART

In NR (New Radio) (also referred to as "5G") as a successor system of LTE (Long Term Evolution), techniques for satisfying a high capacity system, a fast data transmission speed, a low latency, simultaneous connection of a large number of terminals, a low cost, power saving or the like as requirements are being studied (for example, non-patent document 1).

In communication where MIMO (Multiple Input Multiple Output) for the NR is applied (see non-patent document 2, for example), transmission beam forming using a large number of elements is possible. Accordingly, it is envisaged that MU (MultiUser)-MIMO requiring a high spatial separation capability may be effective.

PRIOR ART DOCUMENT

Non-Patent Document

[Non-Patent Document 1] 3GPP TS 38.300 V15.6.0 (2019-06)
[Non-Patent Document 2] 3GPP TS 38.211 V15.6.0 (2019-06)

SUMMARY OF INVENTION

Problem to be Solved by the Invention

The communication where the MU-MIMO is applied can improve throughput of a whole radio communication system in the case where multiple users communicate simultaneously. Meanwhile, signals for simultaneously multiplexed users may lead to inter-user interference for a desired signal, which may adversely influence transmission quality of the communication.

In light of the above aspect, the present invention aims to improve the transmission quality at spatial multiplexing in a radio communication system.

Means for Solving the Problem

According to a technique disclosed herein, a terminal is provided, the terminal comprising: a reception unit configured to receive information associated with a signal transmitted to an apparatus other than the terminal, in MU-MIMO (MultiUser-Multiple Input Multiple Output) and a reference signal from a base station; a control unit configured to estimate interference from the signal transmitted to the apparatus other than the terminal to a signal transmitted to the terminal based on the information associated with the signal transmitted to the apparatus other than the terminal and the reference signal; and a communication unit configured to suppress the interference and receive a data signal from the base station.

Advantage of the Invention

According to the disclosed technique, the transmission quality at spatial multiplexing in a radio communication system can be improved.

EMBODIMENTS OF THE INVENTION

Figure 1:
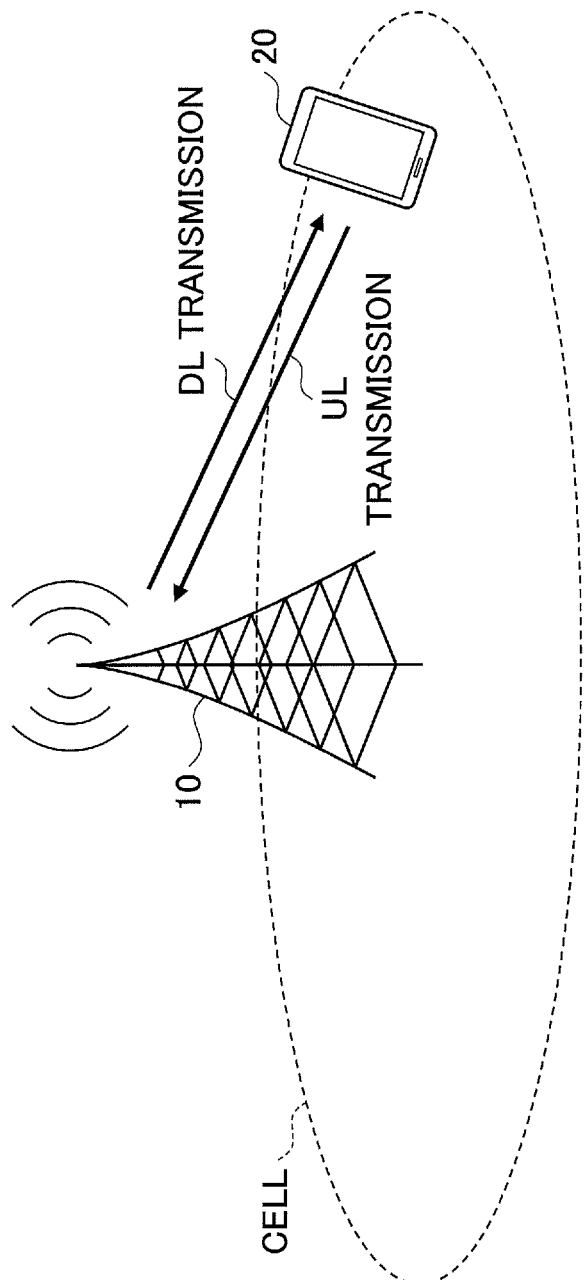
FIG. 1 is a diagram for illustrating an example of arrangement of a radio communication system according to an embodiment of the present invention.

Hereinafter, embodiments of the present invention will be described with reference to the drawings. The embodiments described below are merely examples, and embodiments to which the present invention is applied are not limited to the described embodiments.

In operations of a radio communication system of an embodiment of the present invention, existing techniques are used as needed. Note that the existing techniques are existing LTE, for example, but are not limited to the existing LTE. Also, unless specifically stated otherwise, it should be appreciated that the terminology "LTE" used herein has a broader meaning including LTE-Advanced and its subsequent schemes (e.g., NR).

Also, in the embodiments of the present invention as described below, terms such as "SS (Synchronization Signal)", "PSS (Primary SS)", "SSS (Secondary SS)", "PBCH (Physical Broadcast Channel)", "PRACH (Physical Random Access Channel)", "PDCCH (Physical Downlink Control Channel)", PUCCH (Physical Uplink Control Channel)", "PUSCH (Physical Uplink Shared Channel)" or the like used in the existing LTE are used. These terms are used for the sake of description convenience, and a signal, a function or the like similar to them may be referred to as other wordings. Also, the above terminologies correspond to "NR-SS", "NR-PSS", "NR-SSS", "NR-PBCH", "NR-PRACH", "NR-PDCCH", "NR-PDSCH", "NR-PUCCH", "NR-PUSCH", respectively, in the NR. Note that even if the signals are used in the NR, they may not be explicitly described as "NR-".

Also, in embodiments of the present invention, duplexing schemes may include Time Division Duplexing (TDD), Frequency Division Duplexing (FDD) or other schemes (e.g., flexible duplexing or the like).

Also, in the following description, a signal transmission scheme using transmission beams may be digital beam forming, where precoding vector multiplied signals (precoded with precoding vectors) are transmitted, or analog beam forming, where beam forming is achieved by using a variable phase shifter in a RF (Radio Frequency) circuit. Likewise, a signal reception scheme using reception beams may be digital beam forming, where a predetermined weight vector is multiplied with received signals, or analog beam forming, where beam forming is achieved by using a variable phase shifter in a RF circuit. Also, hybrid beam forming composed of a combination of the digital beam forming and the analog beam forming may be applied. Also, transmitting signals using transmission beams may mean transmitting the signals using a certain antenna port. Similarly, receiving signals using reception beams may mean receiving the signals using a certain antenna port. The antenna port may refer to a logical antenna port or a physical antenna port defined in 3GPP specification.

Note that the forming scheme of transmission beams and reception beams is not limited to the above scheme. For example, in the base station 10 or the terminal 20 including multiple antennas, a scheme where angles of respective antennas are changed may be used, or a scheme where the scheme using the precoding vectors and the scheme of changing the antenna angles are combined may be used. Also, different antenna panels may be switchably used, a combination of schemes where multiple antenna panels are used together may be used, or other schemes may be used. Also, for example, multiple mutually different transmission beams may be used in a high frequency band. Usage of multiple transmission beams may be referred to as multi-beam operation, and usage of a single transmission beam may be referred to as single beam operation.

Also, in embodiments of the present invention, "configuring" a radio parameter or the like may mean that a predetermined value is pre-configured or that a radio parameter indicated from the base station 10 or the terminal 20 is configured.

FIG. 1 is a diagram for illustrating a radio communication system according to an embodiment of the present invention. As illustrated in FIG. 1, the radio communication system according to the embodiment of the present invention includes the base station 10 and the terminal 20. In FIG. 1, the single base station 10 and the single terminal 20 are illustrated, but the illustrated embodiment is merely one example, and a plurality of the base stations 10 and a plurality of the terminals 20 may be provided.

The base station 10 is a communication device that serves one or more cells and wirelessly communicates with the terminal 20. A physical resource for a radio signal is defined with a time domain and a frequency domain. The time domain may be defined by the number of OFDM symbols, and the frequency domain may be defined by the number of subcarriers or the number of resource blocks. The base station 10 transmits a synchronization signal and system information to the terminal 20. The synchronization signal may be an NR-PSS and an NR-SSS, for example. The system information may be transmitted in an NR-PBCH, for example, and may be also referred to as broadcast information. As illustrated in FIG. 1, the base station 10 transmits a control signal or data to the terminal 20 via downlinks (DLs) and receives a control signal or data from the terminal 20 via uplinks (ULs). Either of the base station 10 and the terminal 20 can perform beamforming to transmit and receive signals. Also, either of the base station 10 and the terminal 20 can apply MIMO (Multiple Input Multiple Output) communication to the DLs and ULs. Also, any of the base station 10 and the terminal 20 may communicate via a SCell (Secondary Cell) and a PCell (Primary Cell) in CA (Carrier Aggregation).

The terminal 20 is a communication device having a radio communication function such as a smartphone, a portable telephone, a tablet, a wearable terminal, a M2M (Machine-to-Machine) communication module or the like. As illustrated in FIG. 1, the terminal 20 receives a control signal or data from the base station 10 in DLs and transmits a control signal or data to the base station 10 in ULs to use various communication services provided by the radio communication system.

Figure 2:
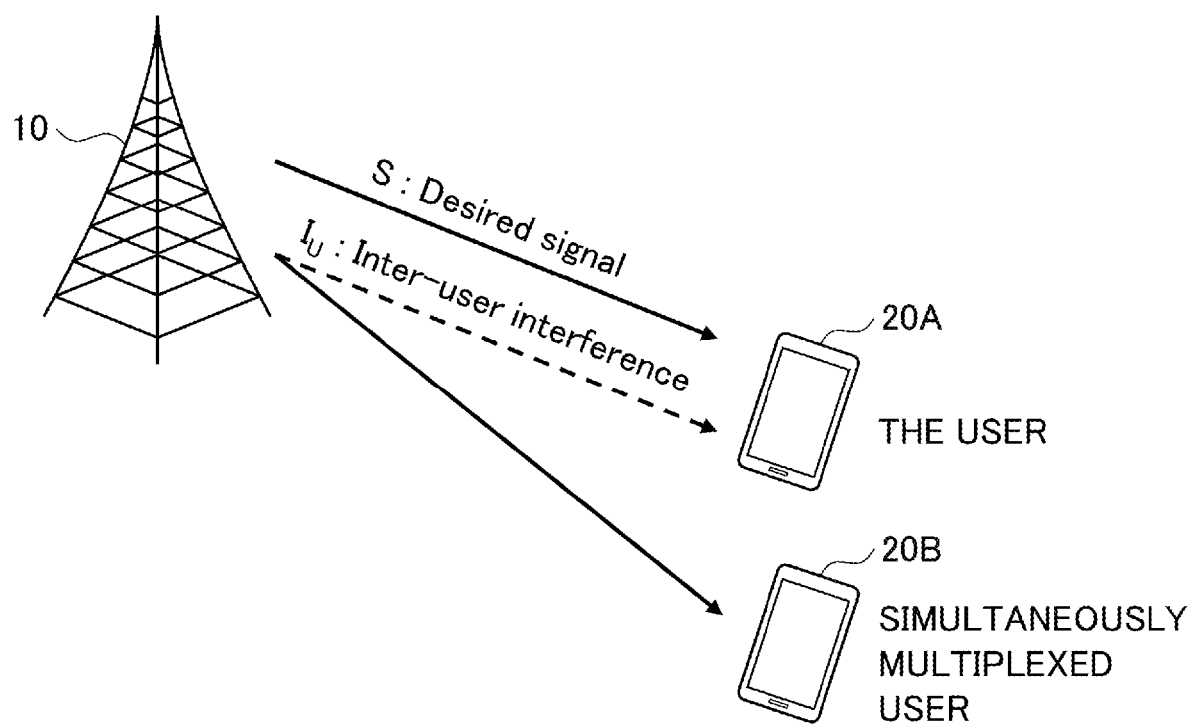
FIG. 2 is a diagram for illustrating an example of MU-MIMO communication according to an embodiment of the present invention.

FIG. 2 is a diagram illustrating an example of MU-MIMO communication according to an embodiment of the present invention. As illustrated in FIG. 2, the present user is a terminal 20A, and a simultaneously multiplexed user is a terminal 20B. If radio signals are simultaneously transmitted from the base station 10 to the terminals 20A and 20B in accordance with the MU-MIMO, a desired signal transmitted to the terminal 20B may cause inter-user interference with a desired signal received at the terminal 20A. Thus, in an embodiment of the present invention, a channel for the simultaneously multiplexed user is estimated to suppress the inter-user interference at a high accuracy.

Here, the simultaneously multiplexed user(s) is(are) one or more of multiple users that are destinations of spatially multiplexed signals excluding the present user. Although the interference suppression in the MU-MIMO is described below as a main embodiment, the embodiment of the present invention can be also applied to other interference sources. Also, the embodiment of the present invention can be applied to both a FDD system and a TDD system.

For example, schemes 1) and 2) below are available for precoding for use in MIMO communication.

1) Non-Precoded RS Based Reception Scheme

Information on a TPMI (Transmitted Precoding Matrix Indicator) is indicated to a receiver. A RS (Reference Signal) is not precoded.

RS transmission: $y = Hx_{RS} + n$

Data transmission: $y = HPx_{Data} + n$ (H: a channel matrix, P: a precoding matrix, n: a noise vector)

The H and P are known at the receiver, and $X_{Data}$ can be decoded based on that information. In other words, the H is estimated at the receiver based on the RS, and the P is indicated as the TPMI from a transmitter.

2) Precoded RS Based Reception Scheme

Information of the TPMI is not indicated to a receiver. The same precoding as data is applied to the RS.

RS transmission: $y = HPx_{RS} + n$

Data transmission: $y = HPx_{Data} + n$ (H: a channel matrix, P: a precoding matrix, n: a noise vector)

The HP is known at the receiver, and $X_{Data}$ can be decoded based on that information. In other words, the HP is estimated at the receiver based on the RS, and respective information on the H or P cannot be estimated.

Also, in the MIMO communication, RS transmission using multiple antenna ports may be performed. Table 1 illustrated below is an example of information to indicate an antenna port configuration for a DMRS (Demodulation Reference Signal) to the terminal 20.

Then, at step S13, the terminal 20 performs channel estimation for the simultaneously multiplexed user. In other words, the terminal 20 performs channel estimation for the terminal 20 based on the assumption that interference arrives in a channel multiplied with an indicated precoder for the non-precoded DMRS channel. Then, at step S14, the terminal 20 suppresses the interference and receives a data signal

TABLE 1

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS COM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| . | . | . | . | . | . | . | . |

As illustrated in Table 1, one or more antenna ports 0 to 7 are used for the DMRS antenna port. Note that a CDM (Code Division Multiplexing) group is an example of the DMRS where 1 (a data channel is multiplexed to a DMRS multiplexed symbol) and 2 (the data channel is not multiplexed to the DMRS multiplexed symbol) are used. Also, it is the example where the number of DMRS assigned symbols is one or two. A configuration of the DMRS antenna port is indicated to the terminal 20 through indication of "Value" as illustrated in Table 1.

Figure 3:
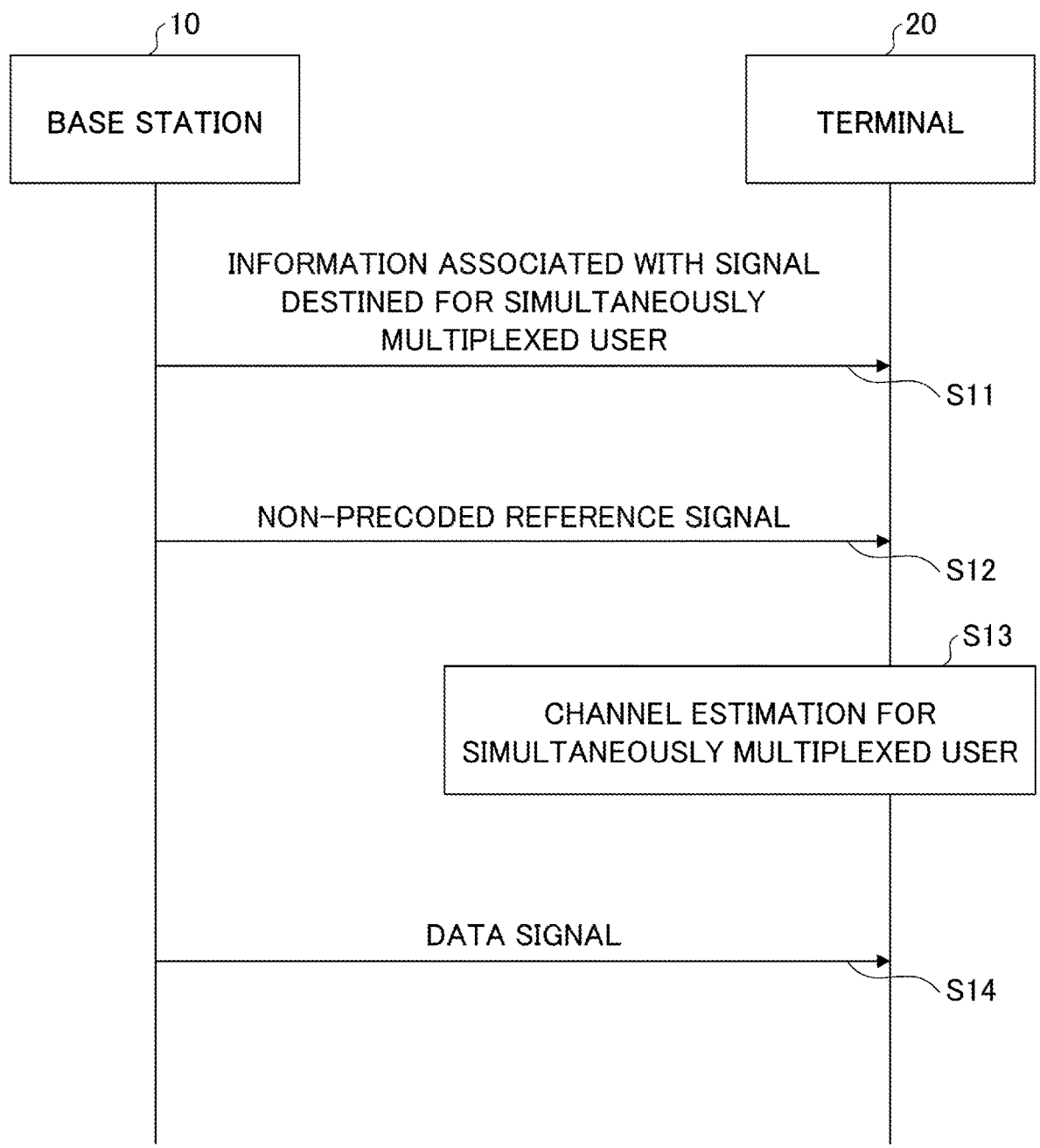
FIG. 3 is a sequence diagram for illustrating an example (1) of data reception according to an embodiment of the present invention.

FIG. 3 is a sequence diagram illustrating an example (1) of data reception according to an embodiment of the present invention. As illustrated in FIG. 3, a reference signal that is not precoded as the DM-RS may be transmitted. Alternatively, a reference signal that is precoded transparently to a receiver may be transmitted.

At step S11 illustrated in FIG. 3, the base station 10 transmits information associated with signals destined for a simultaneously multiplexed user to the terminal 20. For example, the information associated with the signals destined for the simultaneously multiplexed user may be precoder information (TPMI) applied to a data signal destined for the simultaneously multiplexed user. Also, for example, the information associated with the signals destined for the simultaneously multiplexed user may be precoder information applied to the DMRS destined for the simultaneously multiplexed user. Then, at step S12, the base station 10 transmits a non-precoded reference signal to the terminal 20.

transmitted from the base station 10 based on the estimated channel. Signal reception at the terminal 20 for steps S12 and S14 may be performed at the same timing (at the same slot). Note that the data signal at step S14 may be precoded.

By performing the above sequence, individual indication of the information (the number of DMRS ports, sequence generation information and so on) associated with the DMRS for the simultaneously multiplexed user required for the interference channel estimation becomes unnecessary.

Note that generation information for the DMRS destined for the present user, that is various scrambling IDs (scramblingID0, scramblingID1, $N_{SCID}$), cell IDs and so on may be indicated to the terminal 20. If multiple simultaneously multiplexed users exist, a common DMRS may be configured. Meanwhile, the precoder information may be individually configured for the multiple simultaneously multiplexed users.

The "data signal" at step S14 may be a PDSCH, a PDCCH or a PBCH, for example. If all or at least a portion of assignment time and frequency resources for the data signal overlap among the terminals 20 in conjunction with "simultaneously multiplexing", it may be defined as being simultaneously multiplexed.

The information associated with signals destined for the simultaneously multiplexed user that is indicated to the terminal 20 may be information regarding the DMRS antenna port destined for the simultaneously multiplexed user (that is, Value) or the sequence generation information for the DMRS destined for the simultaneously multiplexed user, that is, various scrambling IDs (scramblingID0, scramblingID1, $N_{SCID}$), cell IDs and so on. In this case, the DMRS destined for the simultaneously multiplexed user may be precoded.

Figure 4:
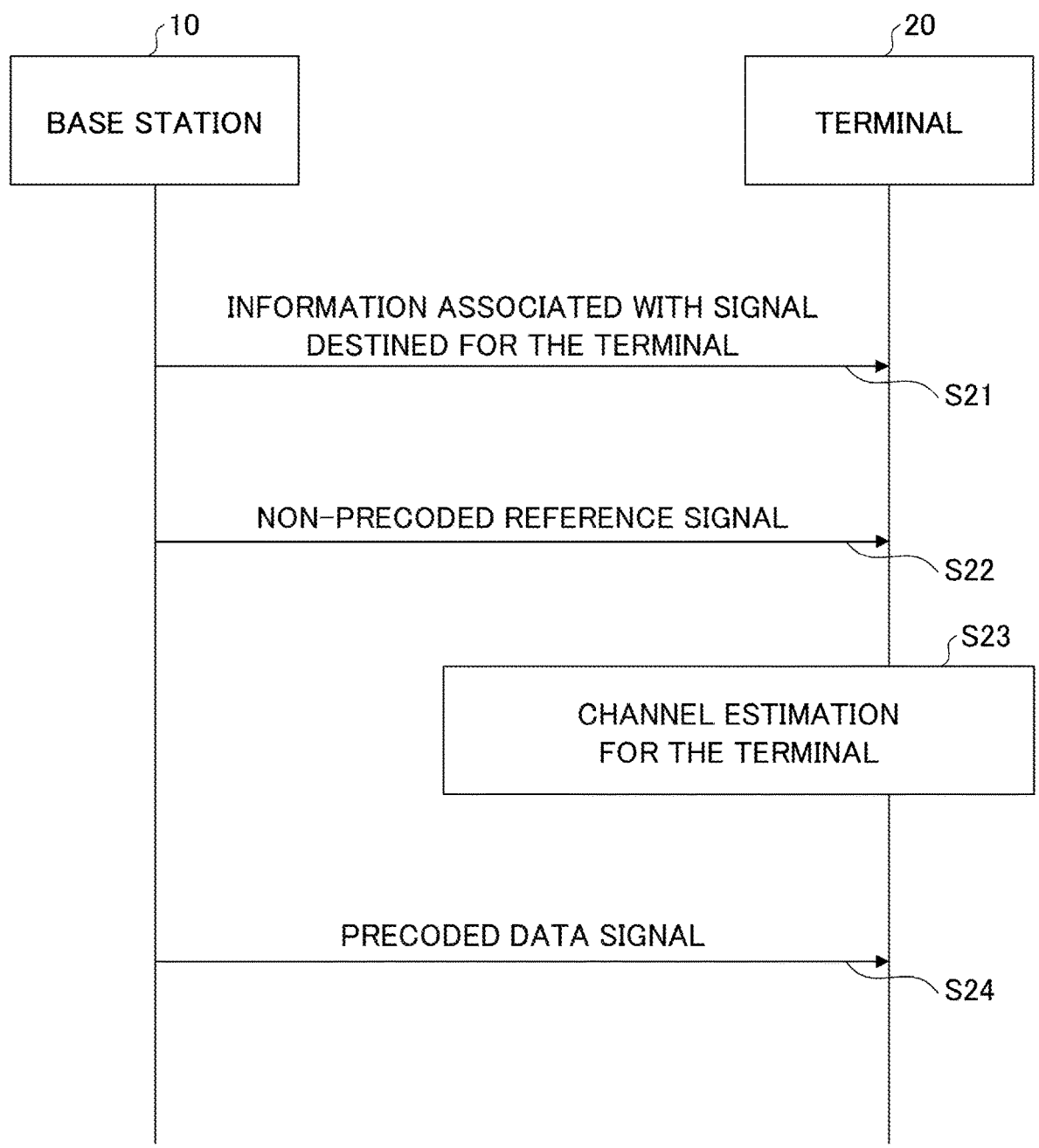
FIG. 4 is a sequence diagram illustrating an example (2) of data reception according to an embodiment of the present invention.

FIG. 4 is a sequence diagram illustrating an example (2) of data reception according to an embodiment of the present invention. As illustrated in FIG. 4, a non-precoded reference signal may be transmitted as the DM-RS.

At step S21 illustrated in FIG. 4, the base station 10 transmits information associated with signals destined for itself to the terminal 20. For example, the information associated with signals destined for itself may be precoder information (TPMI) applied to a data signal destined for itself. Then, at step S22, the base station 10 transmits a non-precoded reference signal to the terminal 20.

Then, at step S23, the terminal 20 performs channel estimation for itself. Specifically, the terminal 20 performs channel estimation based on the assumption that a data channel is received in a channel multiplied with an indicated precoder for the non-precoded DMRS channel. Then, at step S24, the terminal 20 receives a precoded data signal transmitted from the base station 10 based on the estimated channel. Signal reception at the terminal 20 for steps S22 and S24 may be performed at the same timing (at the same slot).

Figure 5:
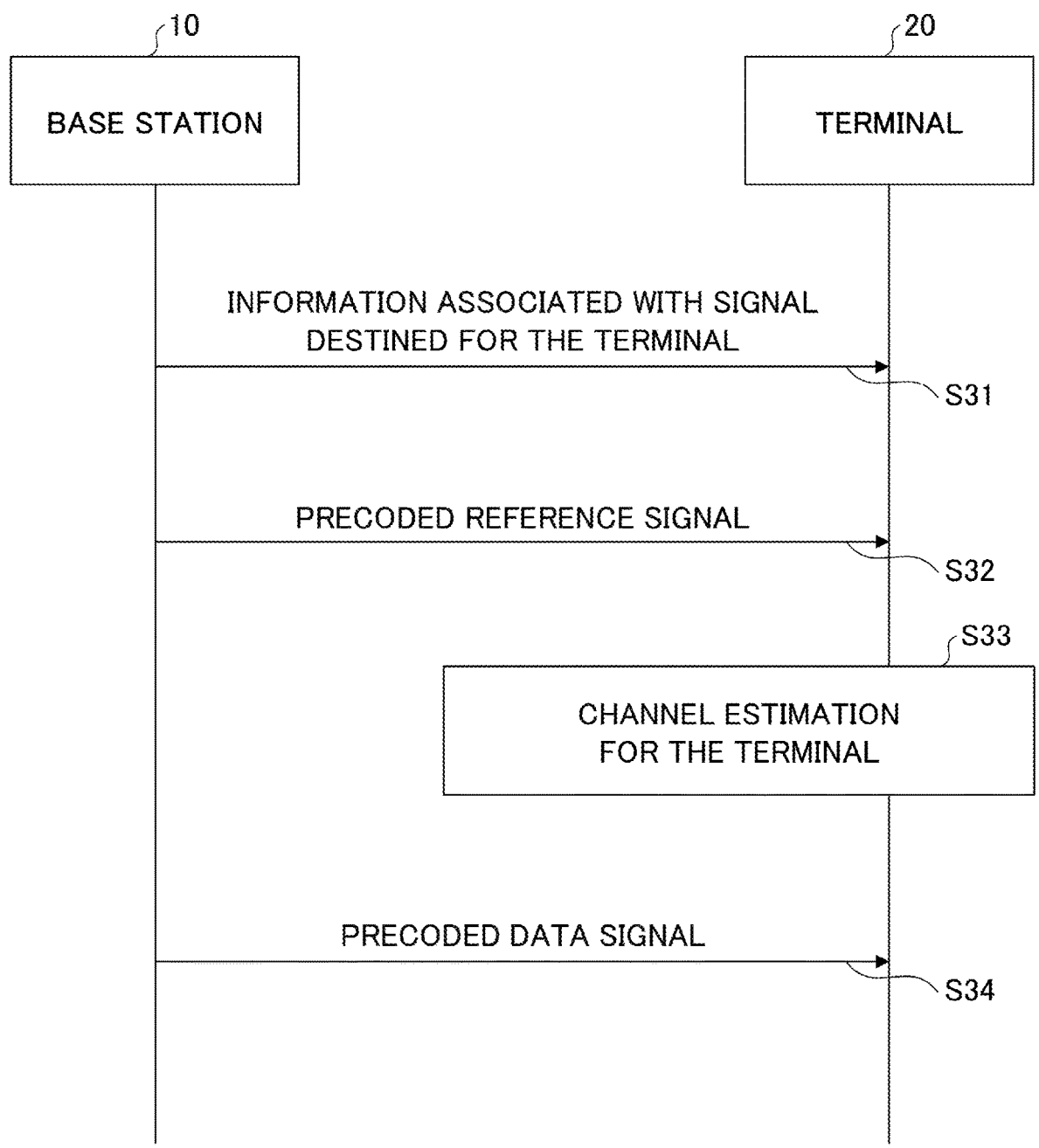
FIG. 5 is a sequence diagram illustrating an example (3) of data reception according to an embodiment of the present invention.

FIG. 5 is a sequence diagram illustrating an example (3) of data reception according to an embodiment of the present invention. As illustrated in FIG. 5, a precoded reference signal may be transmitted as the DM-RS.

At step S31 illustrated in FIG. 4, the base station 10 transmits information associated with signals destined for itself to the terminal 20. For example, the information associated with signals destined for itself may be precoder information applied to the DMRS destined for itself. Then, at step S32, the base station 10 transmits the precoded reference signal to the terminal 20.

Then, at step S33, the terminal 20 performs channel estimation for the terminal 20. In other words, the terminal 20 performs channel estimation for the terminal 20 based on the assumption that a data signal is received in a precoded DMRS channel. Then, at step S34, the terminal 20 receives the precoded data signal transmitted from the base station 10 based on the estimated channel. Note that that signal reception at the terminal 20 for steps S32 and S34 may be performed at the same timing (at the same slot).

The indication of the precoder information illustrated in FIGS. 2, 3 and 4 may be a codebook-based indication. The codebook may be a codebook that is different from or the same as the codebook for use in CSI (Channel State Information) reports. For example, the codebook stipulated for NR may be used. Also, for example, the codebook stipulated for the NR may be partially used, and limitation of a subset may be applied. For example, a flag indicating that a PMI (Precoding Matrix Indicator) fed back for the terminal is the same as a precoder applied to data may be indicated.

Figure 6:
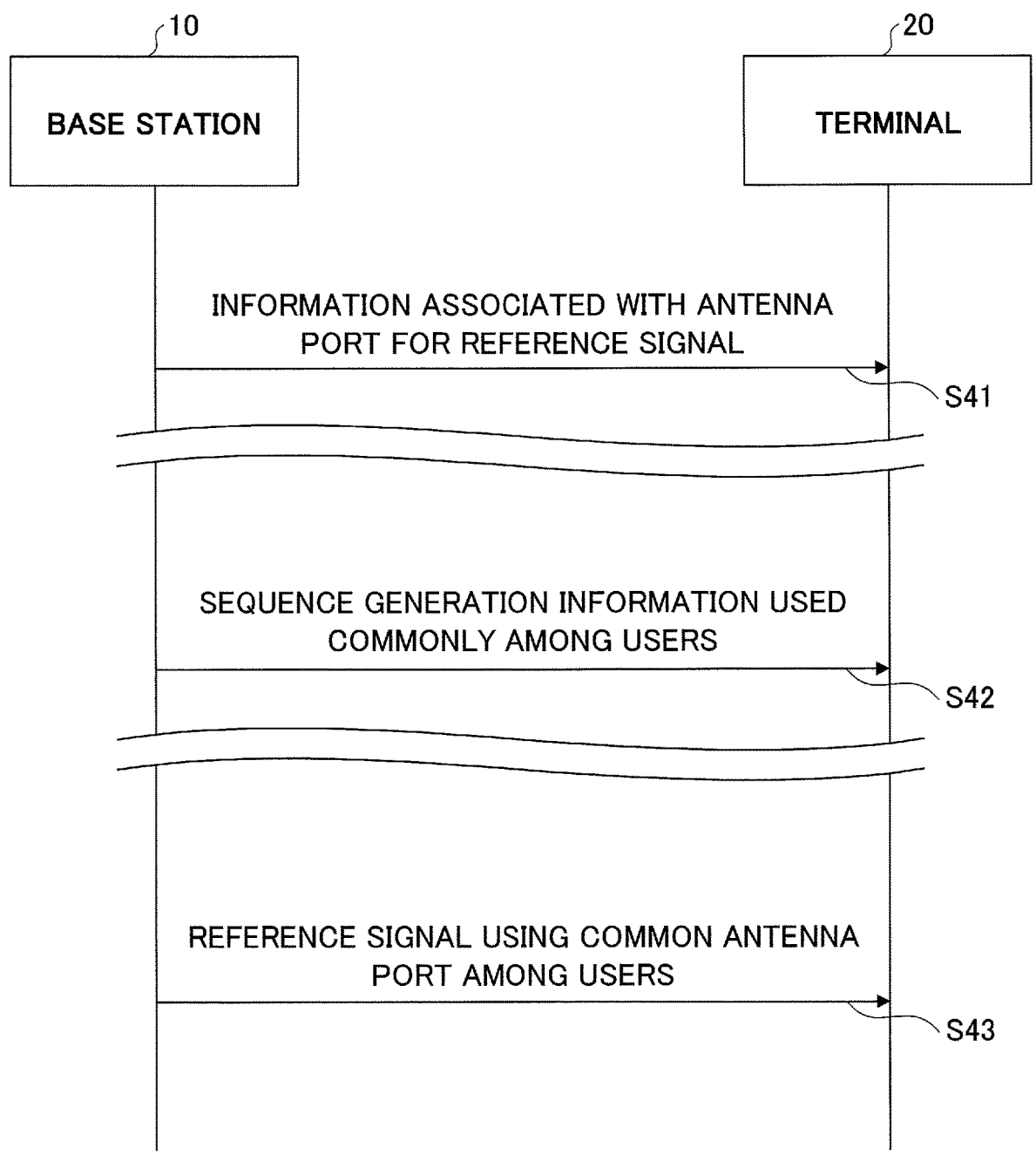
FIG. 6 is a sequence diagram illustrating an example (1) of indication of information according to an embodiment of the present invention.

FIG. 6 is a sequence diagram illustrating an example (1) of information indication according to an embodiment of the present invention. As illustrated in FIG. 6, information associated with a reference signal or the reference signal may be indicated to the terminal 20. The terminal 20 can use the information associated with the reference signal to improve the accuracy of channel estimation. Note that steps S41, S42 and S43 may be performed in any order, or any of the steps may be omitted.

As illustrated in step S41, the base station 10 may transmit information associated with an antenna port for the reference signal to the terminal 20. For example, the DMRSs for the present user and the simultaneously multiplexed user may be arranged to different antenna ports.

For example, information associated with the DMRSs destined for the present user and the simultaneously multiplexed user may be transmitted. Table 2 is an example of the information for indicating an antenna port configuration for the DMRS to the terminal 20.

TABLE 2

| Value | Number of DMRS CDM group(s) without data | DMRS port(s) | Number of front-load symbols |
|---|---|---|---|
| 30 | 2 | 0, 2, 4, 6 | 2 |

In Table 2, by indicating "Value=30", it is indicated that the antenna ports assigned for the DMRS are "0", "2", "4" and "6". Moreover, schemes 1) to 3) below may be performed. In the schemes 1) and 2) below, ports "2", "4" and "6" are used for signals destined for itself, and port "0" is used for signals destined for the simultaneously multiplexed user.

1) At least a portion of antenna ports is assigned to the present user:

Indices of antenna ports may be indicated. For example, "2", "4" and "6" in Table 2 may be indicated. Also, the minimum value and the maximum value of indices of the antenna ports may be indicated. For example, in Table 2, "2" and "6" may be indicated. Also, the order of indices of the antenna ports may be indicated. For example, in Table 2, "the second to fourth" may be indicated.

2) Information associated with antenna ports for the DMRS destined for the simultaneously multiplexed user is indicated:

For example, information associated with antenna ports for the DMRS destined for the simultaneously multiplexed user may be indicated. The terminal 20 may assume that a data signal to which the same precoder as the DMRS destined for the simultaneously multiplexed user is applied may be multiplexed. Similar to the above scheme 1), indices of the antenna ports may be indicated. For example, "0" in Table 2 may be indicated. Also, the minimum value and the maximum value of indices of the antenna ports may be indicated. For example, in Table 2, "0" and "0" may be indicated. Also, the order of indices of antenna ports may be indicated. For example, in Table 2, "the first to first" may be indicated.

3) Information associated with unused antenna ports is indicated:

Information associated with unused antenna ports may be indicated in a manner similar to the above schemes 1) and 2). The terminal 20 may assume that a data signal may not be multiplexed to the DMRS associated with the indicated unused antenna ports.

Note that the base station 10 may refrain from indicating the entire information associated with antenna ports for the above 1) to 3) to the terminal 20. For example, if the above 1) and 2) are indicated, it can be considered that the remaining antenna port is 3). Namely, the two kinds of the information associated with antenna ports for the above 1) to 3) may be indicated. The remaining one type of antenna port information can be calculated based on the information associated with the indicated two kinds of information associated with antenna ports.

Similarly, the base station 10 may refrain from indicating the entire information associated with antenna ports for the above 1) and 2) to the terminal 20. For example, if no unused antenna port for the above 3) exists, one type of antenna port information for the above 1) or 2) may be indicated. The remaining one type of antenna port information may be calculated based on the indicated one type of information associated with the antenna port.

As illustrated in step S42, the base station 10 may indicate sequence generation information used commonly among users to the terminal 20. The sequence generation information may be various scrambling IDs (scramblingIDO, scramblingID1, $N_{SCID}$), cell IDs and so on, for example. Also, the base station 10 may transmit an indication for switching the sequence generation information used commonly among users to the terminal 20. For example, the base station 10 may transmit the indication for switching the sequence generation information used commonly among the users in DCI (Downlink Control Information) to the terminal 20.

As illustrated in step S43, the base station 10 may transmit a reference signal for use of antenna ports common among users to the terminal 20. Namely, an antenna port for the DMRS for a downlink channel (for example, a PDSCH o a PDCCH) may be shared among multiple terminals 20. The DMRS for the shared antenna port may not be precoded. Since the number of antenna ports used for the DMRS can be decreased due to sharing the antenna ports, the shortage of the number of antenna ports for the DMRS can be avoided, which can reduce inter-DMRS port interference in the case where orthogonality of an OCC (Orthogonal Cover Code) has been lost, compared to usage of different antenna ports for the DMRS among users.

Figure 7:
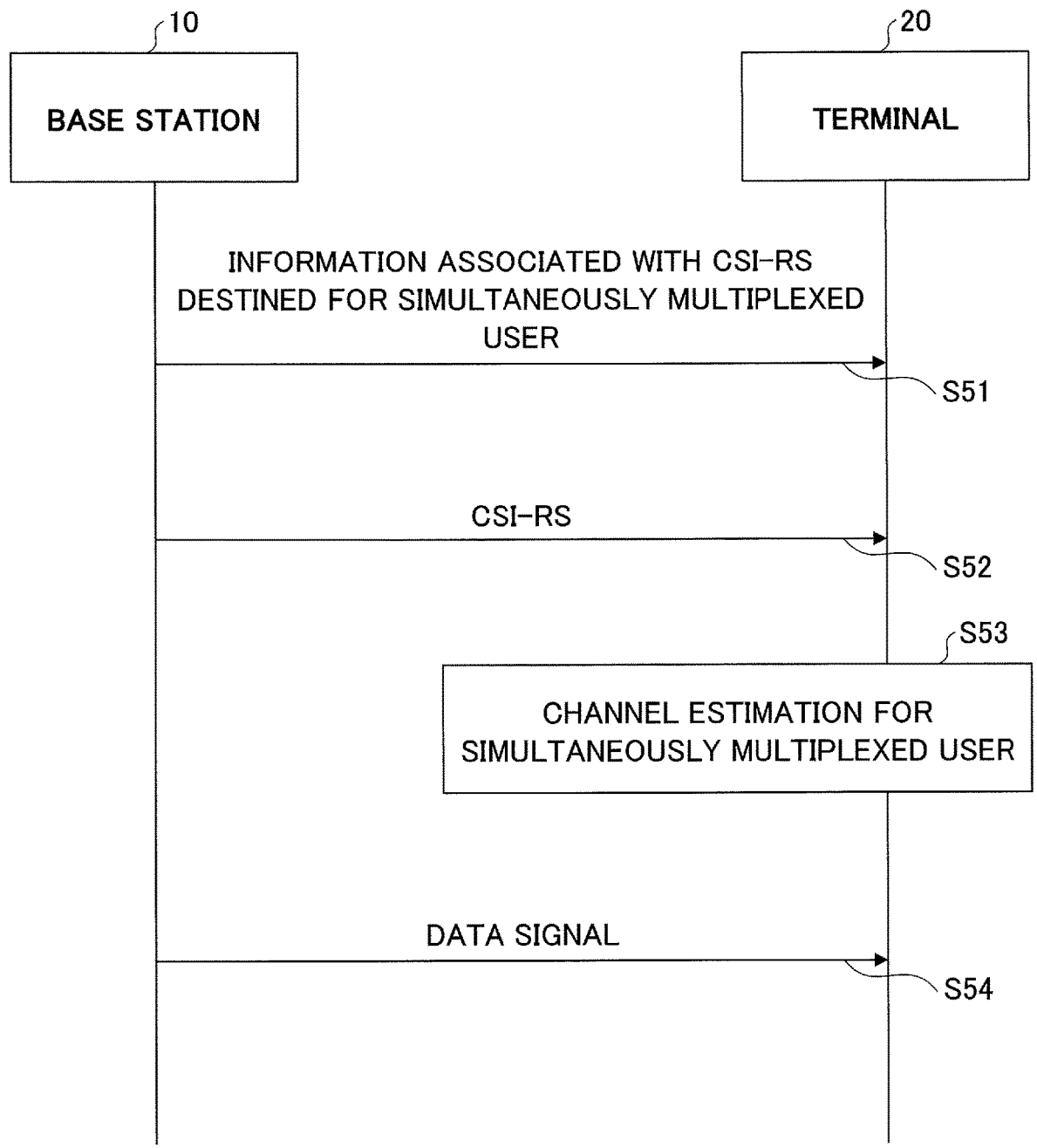
FIG. 7 is a sequence diagram illustrating an example (4) of data reception according to an embodiment of the present invention.

FIG. 7 is a sequence diagram illustrating an example (4) of data reception according to an embodiment of the present invention. As illustrated in FIG. 7, interference channel may not be estimated in the DM-RS. For example, the interference channel may be estimated in a CSI-RS.

At step S51 illustrated in FIG. 7, the base station 10 transmits information associated with the CSI-RS destined for the simultaneously multiplexed user to the terminal 20. For example, the information associated with the CSI-RS destined for the simultaneously multiplexed user may be indicated with downlink resource assignment (for example, DCI format 1_1). Also, a NZP (Non Zero Power) CSI-RS may be used as an IMR (Interference Measurement Resource), and information associated with the NZP CSI-RS may be indicated to the terminal at step S51. Then, at step S52, the base station 10 transmits the CSI-RS to the terminal 20.

Then, at step S53, the terminal 20 performs channel estimation for the simultaneously multiplexed user. For example, the terminal 20 may assume that an interference signal observed in the CSI-RS may be multiplexed to a data signal destined for its user. Then, at step S54, the terminal 20 receives the data signal transmitted from the base station 10 based on the estimated channel.

Figure 8:
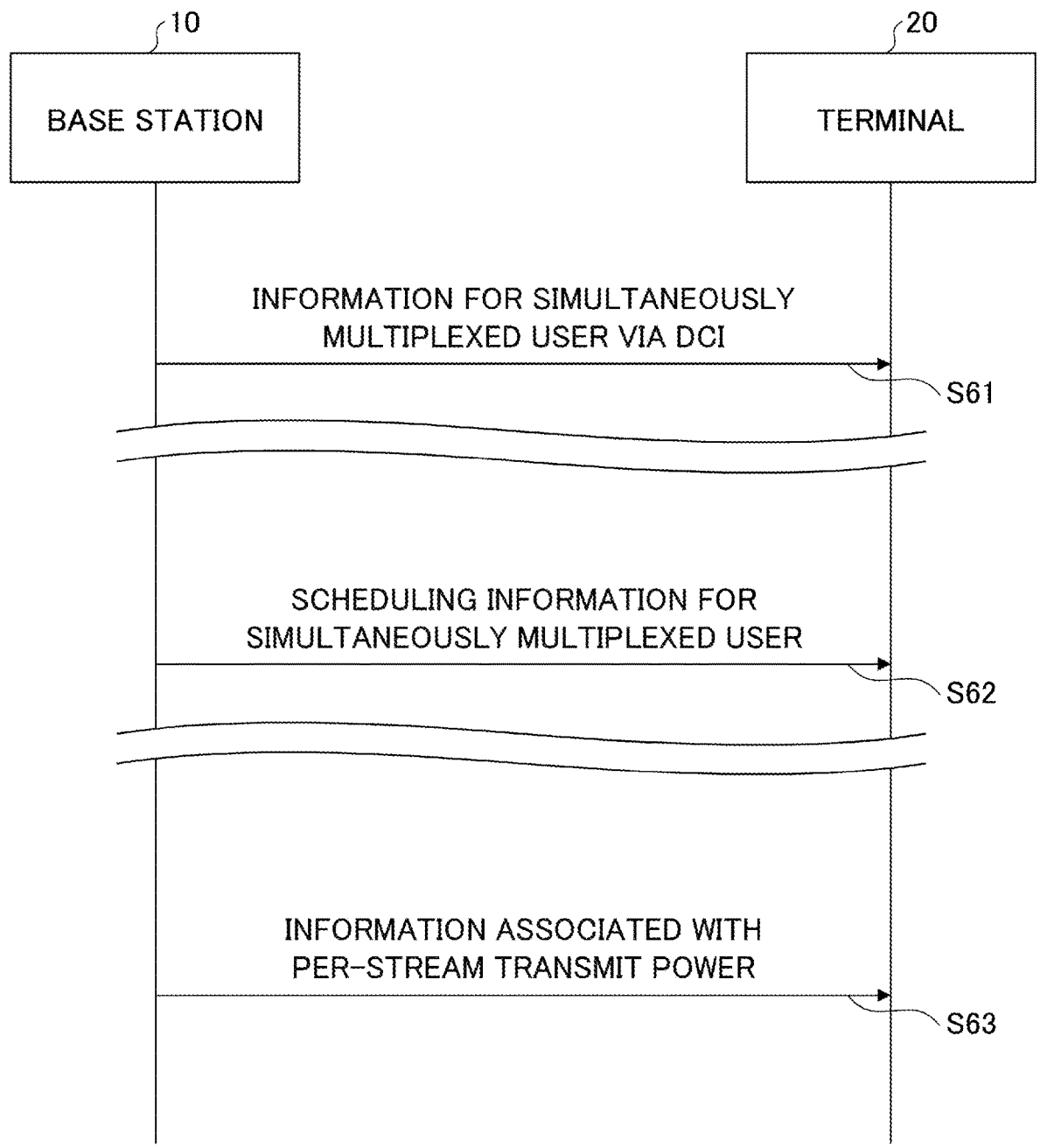
FIG. 8 is a sequence diagram illustrating an example (2) of indication of information according to an embodiment of the present invention.

FIG. 8 is a sequence diagram illustrating an example (2) of information indication according to an embodiment of the present invention. Information as illustrated in FIG. 8 may be indicated from the base station 10 to the terminal 20. The terminal 20 can use the information illustrated in FIG. 8 to improve the accuracy of channel estimation. Note that steps S61, S62 and S63 may be performed in any order, or some of them may be omitted.

As illustrated in step S61, the base station 10 may indicate information for the simultaneously multiplexed user to the terminal 20 via DCI for scheduling a PDSCH. For example, a field for indicating the information for the simultaneously multiplexed user may be added to DCI format 1_1. Also, for example, the DCI format 1_0 may not include the field for indicating the information for the simultaneously multiplexed user. Also, for example, the terminal 20 may assume that the field for indicating the information for the simultaneously multiplexed user may be included in the DCI detected in a UE specific search space or that the field for indicating the information for the simultaneously multiplexed user may not be included in the DCI detected in a common search space. Note that the information for the simultaneously multiplexed user may be indicated to the terminal 20 via the DCI for scheduling the PUSCH (DCI format 0_1 or DCI format 0_0).

As illustrated in step S62, the base station 10 may indicate scheduling information for the simultaneously multiplexed user to the terminal 20. In the NR, frequency scheduling can be applied, and the simultaneously multiplexed users may be different for respective partial bands. The terminal 20 may perform interference suppression under assumption where different users may be simultaneously multiplexed for different bands. For example, a scheduling band for the simultaneously multiplexed users may be indicated to the terminal 20. Also, the scheduling band for a user may be indicated to the user's terminal 20. Also, for example, the terminal 20 may assume that the scheduling band is the same for its user and the simultaneously multiplexed user.

As illustrated in step S63, the base station 10 may indicate information associated with per-stream transmit power to the terminal 20. Optimal reception weights at a receiver depend on power for respective streams. For example, if the power for an interference stream is small, the merit of directing a null beam to the interference stream is small. For example, the information associated with per-stream transmit power may be indicated to the terminal 20 as an offset from a signal (for example, a PDSCH, a DMRS or the like) destined for its user. Also, for example, the information associated with per-stream transmit power may be indicated to the terminal 20 as an offset from a reference signal (for example, a DMRS, a CSI-RS or the like) destined for the simultaneously multiplexed user. The information associated with per-stream transmit power may be grouped for each user and then be indicated. In other words, it may be assumed that the same power has been applied to different streams for a certain terminal 20. Also, for example, the terminal 20 may assume that the same transmit power has been applied among simultaneously multiplexed users. Note that the transmit power may be represented as an EPRE (Energy Per Resource Element).

The embodiments of the present invention can be applied regardless of distinction of uplink and downlink transmission and reception. In this case, an uplink signal or channel can be interchanged with a downlink signal or channel. Also, uplink feedback information can be interchanged with downlink control signaling.

In the present disclosure, although channels and signaling schemes for the NR have been mainly described, embodiments of the present invention can be applied to channels and signaling schemes having the same functionalities as the NR. For example, embodiments of the present invention can be applied to LTE/LTE-A or other RATs (Radio Access Technologies).

In the present disclosure, various signaling examples have been illustrated, but they are not limited to an explicit method. An implicit indication may be used, or signaling is not used and specifications may be uniquely defined in the technical specification.

In the present disclosure, various signaling examples have been illustrated, but embodiments are not limited to the illustrated ones. For example, signaling for different layers such as a RRC, a MAC-CE, DCI or the like may be used, or a MIB (Master Information Block), a SIB (System Information Block) or the like may also be used.

In the present disclosure, some representations such as a beam, a BF (Beam Forming) RS or the like have been used, but it may be transparent to the base station 10 or the terminal 20 whether the physical signal or channel is beamformed. Also, the beam may be formed in unit of antenna port. Similarly, beam selection may be replaced with resource selection or the like, and beam indices may be replaced with resource indices, antenna port indices or the like.

In the present disclosure, MU-MIMO has been described as main embodiments, but other interference sources may be assumed. For example, the interference sources may be inter-cell interference or inter-link interference (for example, interference between an uplink and a downlink, interference between a sidelink and a downlink).

The above-stated embodiments and variations can be combined with each other, and features illustrated in these examples can be combined with each other in various combinations. The embodiments of the present invention are not limited to specific combinations disclosed in the present specification.

According to the above-described embodiments, the terminal 20 acquires information associated with signals transmitted to the simultaneously multiplexed user or information associated with signals transmitted to its user from the base station 10, which reduce interference from the signals transmitted to the simultaneously multiplexed user.

In other words, transmission quality at spatial multiplexing in a radio communication system can be improved.

(Device Arrangement)

Next, an example of functional arrangements of the base station 10 and the terminal 20 that perform operations and actions as stated above are described. The base station 10 and the terminal 20 include functions of implementing the above-stated embodiments. Note that the base station 10 and the terminal 20 each may have only a portion of the functions of the embodiments.

<Base Station 10>

Figure 9:
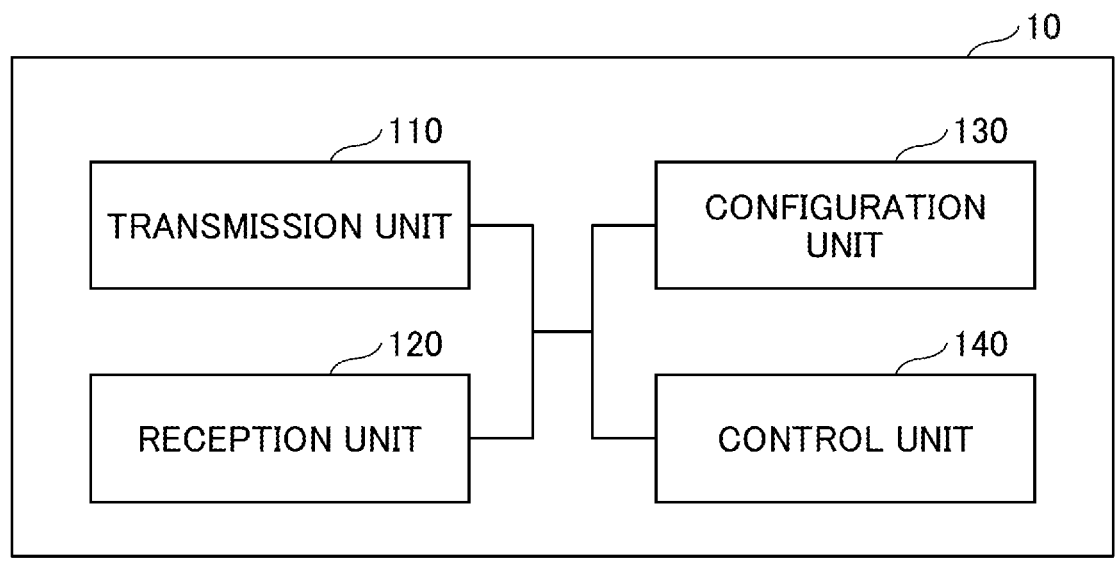
FIG. 9 is a diagram illustrating an example of functional arrangement of a base station 10 according to an embodiment of the present invention.

FIG. 9 illustrates an example of functional arrangement of the base station 10. As shown in FIG. 9, the base station 10 includes a transmission unit 110, a reception unit 120, a configuration unit 130 and a control unit 140. The functional arrangement shown in FIG. 9 is only one example. The functional separation and the names of the functional units may be arbitrary as long as operations according to the present embodiment can be achieved.

The transmission unit 110 includes a function of generating a signal for transmission to the side of the terminal 20 and wirelessly transmitting the signal. Also, the transmission unit 110 transmits inter-network-node messages to other network nodes. The reception unit 120 includes a function of receiving various signals transmitted from the terminal 20 and acquiring information for upper layers from the received signals, for example. Also, the transmission unit 110 includes a function of transmitting an NR-PSS, an NR-SSS, an NR-PBCH, a DL/UL control signal or the like to the terminal 20. Also, the reception unit 120 receives inter-network-node messages from other network nodes.

The configuration unit 130 stores preconfigured configurations and various configurations for transmission to the terminal 20. Contents of the configurations may be information associated with control for MIMO communication or the like, for example.

The control unit 140 performs control associated with the MIMO communication as stated in conjunction with the embodiments. Also, the control unit 140 indicates information associated with a reference signal to the terminal 20. The functional portions of the control unit 140 related to signal transmission may be included in the transmission unit 110, and the functional portions of the control unit 140 related to signal reception may be included in the reception unit 120.

<Terminal 20>

Figure 10:
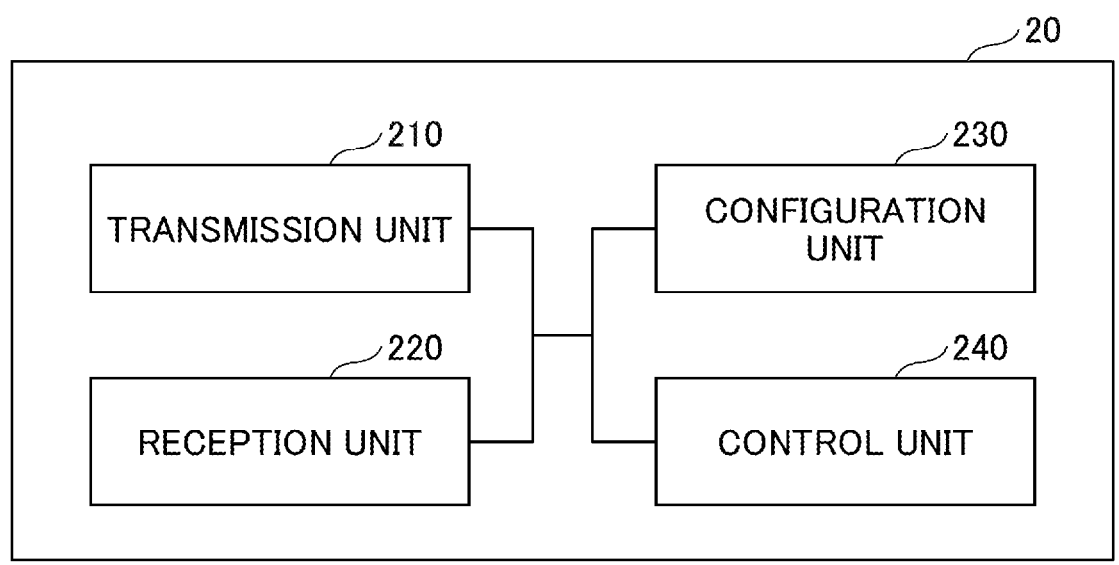
FIG. 10 is a diagram illustrating an example of functional arrangement of a terminal 20 according to an embodiment of the present invention.

FIG. 10 is a diagram illustrating an example of functional arrangement of the terminal 20. As illustrated in FIG. 10, the terminal 20 has a transmission unit 210, a reception unit 220, a configuration unit 230 and a control unit 240. The functional arrangement shown in FIG. 10 is only one example. The functional separation and the names of the functional units may be arbitrary as long as operations according to the present embodiment can be achieved.

The transmission unit 210 generates a transmission signal from transmission data and wirelessly transmits the transmission signal. The reception unit 220 wirelessly receives various signals and acquires signals for upper layers from the received physical layer signals. Also, the reception unit 220 has a function of receiving an NR-PSS, an NR-SSS, an NR-PBCH, a DL/UL/SL control signal and so on transmitted from the base station 10. Also, for example, as D2D communication, the transmission unit 210 transmits a PSCCH (Physical Sidelink Control Channel), a PSSCH (Physical Sidelink Shared Channel), a PSDCH (Physical Sidelink Discovery Channel), a PSBCH (Physical Sidelink Broadcast Channel) or the like to other terminals 20, and the reception unit 120 receives the PSCCH, the PSSCH, the PSDCH, the PSBCH or the like from other terminals 20.

The configuration unit 230 stores various configurations received at the reception unit 220 from the base station 10. Also, the configuration unit 230 stores preconfigured configurations. Contents of the configurations may be information associated with the control for MIMO communication and so on, for example.

The control unit 240 performs control associated with the MIMO communication including estimation of an interference channel as stated above. Also, the control unit 240 acquires information associated with a reference signal from the base station 10. The functional portion of the control unit 240 regarding signal transmission may be included in the transmission unit 210, and the functional portion of the control unit 240 regarding signal reception may be included in the reception unit 220.

(Hardware Arrangement)

The block diagrams (FIGS. 9 and 10) used for the description of the above embodiments show blocks of functional units. These functional blocks (components) are implemented by any combination of at least one of hardware and software. In addition, the implementation method of each function block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, etc. For example, a functional block (component) that functions to transmit is called a transmitting unit or a transmitter. In either case, as described above, the implementation method is not particularly limited.

Figure 11:
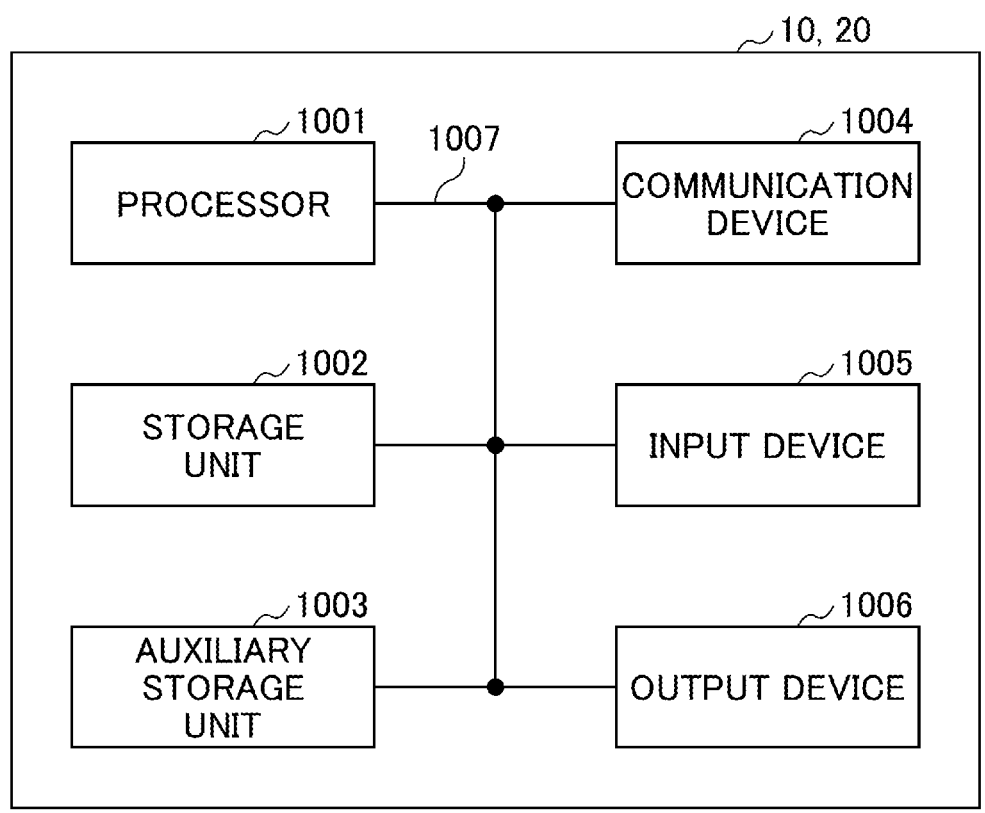
FIG. 11 is a diagram illustrating an example of hardware arrangement of the base station 10 or the terminal 20 according to an embodiment of the present invention.

For example, each of the base station 10, the terminal 20 and so on according to one embodiment of the present invention may function as a computer performing operations for a radio communication method according to this embodiment. FIG. 11 is a diagram illustrating an example of a hardware configuration of the base station 10 and the terminal 20 according to one embodiment of the present disclosure. The base station 10 and the terminal 20 as stated above may be physically configured as a computer device including a processor 1001, a memory 1002, a storage 1003, a communication device 1004, an input device 1005, an output device 1006, a bus 1007, etc.

In the following description, the term "device" can be read as a circuit, a device, a unit, etc. The hardware configuration of the base station 10 and the terminal 20 may be configured to include one or more of the respective devices shown in the figure, or may be configured without some devices.

Each function of the base station 10 and the terminal 20 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, etc. For example, the above-stated control units 140 and 240 or the like may be implemented with the processor 1001.

Additionally, the processor 1001 reads a program (program code), a software module, data, etc., from at least one of the storage 1003 and the communication device 1004 to the memory 1002, and executes various processes according to these. As the program, a program is used which causes a computer to execute at least a part of the operations described in the above-described embodiment. For example, the control unit 140 of the base station 10 shown in FIG. 9 may be implemented by a control program that is stored in the memory 1002 and that is operated by the processor 1001. Also, for example, the control unit 240 of the terminal 20 shown in FIG. 10 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a ROM (Read Only Memory), an EPROM (Erasable Programmable ROM), an EEPROM (Electrically Erasable Programmable ROM), a RAM (Random Access Memory), etc. The memory 1002 may be referred to as a register, a cache, a main memory (main storage device), etc. The memory 1002 may store a program (program code), a software module, etc., which can be executed for implementing the radio communication method according to one embodiment of the present disclosure.

The storage 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, etc. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, etc. The communication device 1004 may be configured to include, for example, a high frequency switch, a duplexer, a filter, a frequency synthesizer, etc., to implement at least one of frequency division duplexing (FDD: Frequency Division Duplex) and time division duplexing (TDD:

Time Division Duplex). For example, a transceiver antenna, an amplification unit, a transceiver unit, a channel interface or the like may be implemented with the communication device 1004. The transceiver unit may have an implementation with the transmission unit and the reception unit that are physically or logically separated.

The input device 1005 is an input device (e.g., a keyboard, a mouse, a microphone, a switch, a button, a sensor, etc.) that receives an external input. The output device 1006 is an output device (e.g., a display, speaker, LED lamp, etc.) that performs output toward outside. The input device 1005 and the output device 1006 may be configured to be integrated (e.g., a touch panel).

Each device, such as processor 1001 and memory 1002, is also connected by the bus 1007 for communicating information. The bus 1007 may be formed of a single bus or may be formed of different buses between devices.

Also, the base station 10 and the terminal 20 may include hardware, such as a microprocessor, a digital signal processor (DSP: Digital Signal Processor), an ASIC (Application Specific Integrated Circuit), a PLD (Programmable Logic Device), and a FPGA (Field Programmable Gate Array), which may implement some or all of each functional block. For example, the processor 1001 may be implemented using at least one of these hardware components.

(Conclusion of the Embodiments)

As stated above, according to an embodiment of the present invention, a terminal is provided; the terminal comprising: a reception unit configured to receive information associated with a signal transmitted to an apparatus other than the terminal, in MU-MIMO (MultiUser-Multiple Input Multiple Output) and a reference signal from a base station; a control unit configured to estimate interference from the signal transmitted to the apparatus other than the terminal to a signal transmitted to the terminal, based on the information associated with the signal transmitted to the apparatus other than the terminal and the reference signal; and a communication unit configured to suppress the interference and receive a data signal from the base station.

According to the above arrangement, the terminal 20 can reduce interference from signals transmitted to simultaneously multiplexed users by obtaining information associated with the signals transmitted to the simultaneously multiplexed users from the base station 10. In other words, transmission quality at spatial multiplexing in a radio communication system can be improved.

The control unit may estimate the interference from the signal transmitted to the apparatus other than the terminal to the signal transmitted to the terminal, based on a non-precoded reference signal. According to the arrangement, the terminal 20 receives the information associated with the signals transmitted to the simultaneously multiplexed users and the non-precoded reference signal from the base station 10 and can accordingly reduce the interference from the signals transmitted to the simultaneously multiplexed users to a desired signal.

The information associated with the signal transmitted to the apparatus other than the terminal may include precoder information applied to a data signal transmitted to the apparatus other than the terminal. According to the arrangement, the terminal 20 receives the precoder information applied to a data signal transmitted to the simultaneously multiplexed users and a non-precoded reference signal from the base station 10, which can reduce interference from the signal transmitted to the simultaneously multiplexed users to a desired signal.

The information associated with the signal transmitted to the apparatus other than the terminal may include information associated with an antenna port, information associated with a scheduled frequency domain or information associated with per-stream transmit power. According to the arrangement, the base station 10 indicates which to use an antenna port applied to the signal transmitted to the simultaneously multiplexed users or an antenna port applied to the signal transmitted to the user of the terminal 20 to the terminal 20, which can reduce interference from the signal transmitted to the simultaneously multiplexed users to a desired signal. Also, the base station 10 indicates the information associated with transmit power for each stream transmitted to the simultaneously multiplexed users to the terminal 20, which can reduce interference from the signal transmitted to the simultaneously multiplexed users to a desired signal.

The information associated with the antenna port may indicate that different antenna ports are used for the terminal and the apparatus other than the terminal. According to the arrangement, the base station 10 indicates to the terminal 20 that an antenna port applied to the signal transmitted to the simultaneously multiplexed users is different from an antenna port applied to the signal transmitted to the user of the terminal 20, which can reduce interference from the signal transmitted to the simultaneously multiplexed users to a desired signal.

Also, according to an embodiment of the present invention, there is provided a communication method implemented by a terminal, comprising: receiving information associated with a signal transmitted to an apparatus other than the terminal, in MU-MIMO (MultiUser-Multiple Input Multiple Output) and a reference signal from a base station; estimating interference from the signal transmitted to the apparatus other than the terminal to a signal transmitted to the terminal, based on the information associated with the signal transmitted to the apparatus other than the terminal and the reference signal; and suppressing the interference and receiving a data signal from the base station.

According to the above arrangement, the terminal 20 can reduce interference from signals transmitted to simultaneously multiplexed users by obtaining information associated with the signals transmitted to the simultaneously multiplexed users from the base station 10. In other words, transmission quality at spatial multiplexing in a radio communication system can be improved.

(Supplemental Embodiments)

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station 10 and the terminal 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (a MIB (Master Information Block) and a SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also, a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an example of order and the methods are not limited to the specific orders presented.

The specific operations performed by the base station 10 described in the present disclosure may in some cases be performed by an upper node. It is clear that, in a network that includes one or more network nodes including the base station 10, various operations performed for communication with the terminal 20 can be performed by at least one of the base station 10 and another network node other than the base station 10 (for example, a MME, a S-GW, or the like may be mentioned, but not limited thereto). In the above, the description has been made for the case where another network node other than the base station 10 is a single node as an example. However, the other network node may be a combination of a plurality of other network nodes (for example, an MME and a S-GW).

Information, signals, or the like described in the present disclosure may be output from an upper layer (or a lower layer) to a lower layer (or an upper layer). Information, signals, or the like described in the present disclosure may be input and output via a plurality of network nodes.

Information or the like that has been input or output may be stored at a predetermined location (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Also, software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Also, information, parameters, and the like described in the present disclosure may be expressed by absolute values, may be expressed by relative values with respect to predetermined values, and may be expressed by corresponding different information. For example, radio resources may be indicated by indices.

The above-described names used for the parameters are not restrictive in any respect. In addition, formulas or the like using these parameters may be different from those explicitly disclosed in the present disclosure. Various channels (for example, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells. In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication device, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Things) device such as a sensor.

In addition, a base station according to the present disclosure may be read as a user terminal. For example, each aspect or embodiment of the present disclosure may be applied to a configuration in which communication between a base station and a user terminal is replaced by communication between a plurality of user equipments 20 (that may be called D2D (Device-to-Device), V2X (Vehicle-to-Everything), or the like). In this case, a user equipment 20 may have above-described functions of the base station apparatus 10. In this regard, a word such as "up" or "down" may be replaced with a word corresponding to communication between terminals (for example, "side"). For example, an uplink channel, a downlink channel, or the like may be replaced with a side channel.

Similarly, a user terminal according to the present disclosure may be read as a base station. In this case, a base station may have above-described functions of the user terminal.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above-described apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of numerology.

The numerology may be a communication parameter that is applied to at least one of transmission and reception of a signal or a channel. The numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in a frequency domain, a specific windowing processing performed by a transceiver in a time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on the numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit for transmitting a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, a normal TTI, a subframe, and the like) may be read as TTI having a time length exceeding 1 ms, and a short TTI (for example, a shortened TTI) may be read as a TTI having a TTI length less than the TTI length of the long TTI and equal to or more than 1 ms.

A resource block (RB) is a resource assignment unit in terms of a time domain and a frequency domain and may include one or a plurality of consecutive subcarriers in terms of frequency domain. The number of subcarriers included in an RB may be the same regardless of the numerology, and, for example, may be 12. The number of subcarriers included in a RB may be determined based on the numerology.

Also, in terms of the time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

Also, a resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for certain numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of configured BWPs may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following the article is of a plural form.

Throughout the present disclosure, an expression that "A and B are different" may mean that "A and B are different from each other". Also, this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, the DMRS is one example of a reference signal used for demodulation. The CSI-RS is one example of a reference signal used to obtain a channel state. The transmission unit 210 and the reception unit 220 is one example of a communication unit.

Although an embodiment(s) of the present invention has/have been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

LIST OF REFERENCE SYMBOLS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Memory
1003 Storage
1004 Communication device
1005 Input device
1006 Output device

The invention claimed is:

1. A terminal, comprising:
a receiver configured to receive
information associated with a signal transmitted to an apparatus other than the terminal, in MU-MIMO (Multi User-Multiple Input Multiple Output) and
a reference signal from a base station; and
a processor configured to estimate interference from the signal transmitted to the apparatus other than the terminal to a signal transmitted to the terminal, based on the information associated with the signal transmitted to the apparatus other than the terminal and the reference signal, wherein
the receiver is further configured to suppress the interference and receive a data signal from the base station, and the processor estimates the interference from the signal transmitted to the apparatus other than the terminal to the signal transmitted to the terminal, based on the reference signal that is not precoded.

2. The terminal as claimed in claim 1, wherein the information associated with the signal transmitted to the apparatus other than the terminal includes precoder information applied to the signal transmitted to the apparatus other than the terminal.

3. The terminal as claimed in claim 2, wherein the information associated with the signal transmitted to the apparatus other than the terminal includes information associated with an antenna port, information associated with a scheduled frequency domain or information associated with per-stream transmit power.

4. The terminal as claimed in claim 3, wherein the information associated with the antenna port indicates that different antenna ports are used for the terminal and for the apparatus other than the terminal.

5. A communication method implemented by a terminal, comprising:
receiving
information associated with a signal transmitted to an apparatus other than the terminal, in MU-MIMO (MultiUser-Multiple Input Multiple Output) and
a reference signal from a base station;
estimating interference from the signal transmitted to the apparatus other than the terminal to a signal transmitted to the terminal, based on the information associated with the signal transmitted to the apparatus other than the terminal and the reference signal;
suppressing the interference and receiving a data signal from the base station; and
estimating the interference from the signal transmitted to the apparatus other than the terminal to the signal transmitted to the terminal, based on the reference signal that is not precoded.

* * * * *